United States Patent
Anderson et al.

(10) Patent No.: US 8,229,977 B1
(45) Date of Patent: Jul. 24, 2012

(54) WEB SITE DEPLOYMENT FRAMEWORK

(75) Inventors: William S. Anderson, Independence, MO (US); Xiaoqin Feng, Overland Park, KS (US); Arthur Glass, Jr., Overland Park, KS (US); Scott E. Skahan, Kansas City, MO (US); Vijaybabu Srinivasan, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 229 days.

(21) Appl. No.: 12/718,442

(22) Filed: Mar. 5, 2010

(51) Int. Cl.
G06F 9/44 (2006.01)
G06F 7/00 (2006.01)
G06F 17/30 (2006.01)
G06F 15/177 (2006.01)
G06F 12/00 (2006.01)

(52) U.S. Cl. .................. 707/805; 717/124; 709/221

(58) Field of Classification Search .................. 717/124; 707/805; 709/221
See application file for complete search history.

(56) References Cited

U.S. PATENT DOCUMENTS

| | | | |
|---|---|---|---|
| 6,157,926 A * | 12/2000 | Appleman et al. | 707/805 |
| 2003/0115302 A1 * | 6/2003 | Teraoaka et al. | 709/221 |
| 2003/0154279 A1 * | 8/2003 | Aziz | 709/225 |
| 2007/0074172 A1 * | 3/2007 | Bird et al. | 717/127 |

* cited by examiner

Primary Examiner — Greta Robinson
Assistant Examiner — Brian E. Weinrich (57) ABSTRACT

A system is provided comprising a processor, database, memory, and application that builds a frequently asked question facility for a web site supported by a frequently asked question portion of the database. The facility provides an interface for adding questions, answers, answer references, and defining subordination among entries. The system builds a trouble reporting facility supported by a trouble reporting portion of the database, wherein the facility provides an interface for adding trouble descriptions, identifying an individual assigned to fix the trouble, and adding comments. The system builds an enhancement tracking facility for the site supported by an enhancement portion of the database and coupled to the trouble reporting facility. An enhancement entry in the enhancement portion of the database is created by converting a trouble ticket entry in the trouble ticket portion of the database. The system builds a documentation facility supported by a documentation portion of the database.

20 Claims, 3 Drawing Sheets

WEB SITE DEPLOYMENT FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Web sites or Internet sites are collections of related web pages, images, or other digital objects that are addressed with a common domain name or in a network using the internet protocol (IP). A web site is hosted on at least one web server, accessible via the Internet or a private local area network. Web pages are documents typically written in plain text containing formatting instructions of hypertext markup language (HTML) and may provide navigation to other web pages via hypertext links. A web page may incorporate elements from other websites with suitable markup coding. Web pages may be appropriate for the World Wide Web and can be accessed through a web browser and displayed on a computer screen. Web pages are accessed and content transported with the hypertext transfer protocol (HTTP), which may optionally employ encryption to provide security and privacy. The user's application, often a web browser, renders the page content according to its HTML markup language instructions onto the user's display. The pages of a website are accessed from a uniform resource locator (URL). The uniform resource locators of the accessed pages organize them into a hierarchy, although linking between the pages conveys the user's perceived site structure and guides the user's navigation of the site.

SUMMARY

In an embodiment, a web site construction system is provided. The system comprises a processor, a database coupled to the processor, a memory, and an application stored in the memory that, when executed by the processor, builds a frequently asked question facility for a first web site, the frequently asked question facility supported by a frequently asked question portion of the database, wherein the frequently asked question facility provides an interface for adding questions, adding answers, adding references to answers, and defining the subordination among a plurality of frequently asked question entries. The system also builds a trouble reporting facility for the first web site, the trouble reporting facility supported by a trouble reporting portion of the database, wherein the trouble reporting facility provides an interface for adding trouble descriptions, identifying an individual assigned to fix the trouble, and adding comments. The system also builds an enhancement tracking facility for the first web site, the enhancement tracking facility supported by an enhancement portion of the database and the enhancement tracking facility coupled to the trouble reporting facility so that an enhancement entry in the enhancement portion of the database is created by converting a trouble ticket entry in the trouble ticket portion of the database. The system also builds a documentation facility for the first web site, the documentation facility supported by a documentation portion of the database.

In an embodiment, a trouble ticket and enhancement ticket system is provided. The system comprises a computer having a processor and memory, a database coupled to the computer, and an application stored in the memory that, when executed by the processor, provides a trouble ticket interface for creating and interworking with a plurality of trouble tickets stored in the database, for adding comments to a selected trouble ticket, for searching the trouble tickets, and for converting a selected trouble ticket to an enhancement ticket in the database. The system also provides an enhancements interface for displaying a plurality of enhancement tickets stored in the database and for adding an estimated level-of-effort for completing the enhancement. The system also provides a frequently asked questions interface for viewing a plurality of frequently asked questions stored in the database and for adding a frequently asked question and answer to the database. The system also presents controls to select the trouble ticket interface, the enhancements interface, and the frequently asked questions interface on a display screen.

In an embodiment, a processor-implemented method of building a web site is provided. The method comprises creating an entry in a database defining a name of the web site and receiving a log-in entry to access the web site, wherein the log-in entry comprises the name of the web site. The method also comprises creating entries in a frequently asked questions portion of the web site using a frequently asked question interface, wherein the interface supports entering answers in one of a text format, a hypertext markup language format, and by providing a reference to content. The method also comprises creating entries in a trouble ticket reports portion of the web site using a trouble ticket report interface, wherein the interface supports adding comments to trouble tickets and converting a trouble ticket to an enhancement ticket. The method also comprises converting a trouble ticket to an enhancement ticket and adding an estimate of a level-of-effort to complete an enhancement documented by the enhancement ticket.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system or framework allowing creation of multiple instances of customized support sites sharing one or more databases for individual projects or working groups in an organization. The web site development framework taught herein enables creation of a web site associated with a database providing data store linkage across a plurality of information services or facilities accessible from the web site. A web site may be created for a project group or functional area in an organization with facilities created within the site for frequently asked questions, trouble ticket and enhancement request submission, and document storage specific to the purpose of the web site. The database may contain a single data store for the web site. Entries made to the web site through one of the four facilities may be searchable and visible from each of the facilities. Linkages between the four facilities and their data stores permit data originally entered using one facility to be potentially accessible from any of the facilities. A web site taught by the present disclosure effectively provides a plurality of frameworks or views into the database.

A department in a large organization may develop products, undertake a project, administer services, or perform another function wherein department members wish to share information, collaboratively solve problems, and propose and request improvements to their processes, applications, and products. The present disclosure teaches the establishment of a plurality of web sites using, for example, JAVA SERVER PAGES containing facilities to post and view frequently asked questions and their answers. Additional facilities permit opening of trouble tickets and enhancement requests for the web sites or associated applications. Multiple related trouble tickets and enhancement requests may be searchable, viewable, and available for comment by general department members and others. Sessions opened and data stored from within one facility may be visible and accessible to the other facilities. Problems or requests entered through one facility may be resolved or satisfied using a different facility.

The present disclosure teaches the movement of content between the frequently asked questions facility and the trouble reporting facility. The single integrated data store makes possible the accessibility and movement of information across facilities. Each facility may automatically search the other facilities when searching for solutions. Trouble tickets and enhancement requests may be visible to all users permitted access to the web site instead of merely the user that opened the ticket and the party that solved the problem. Any user may be able to add comments and suggestions to a posted question or an open trouble ticket or enhancement request. The simplicity taught by the present disclosure allows users to provide structure to their site and reduce support costs by removing organizational support people from direct daily involvement with the web site.

Figure 1:
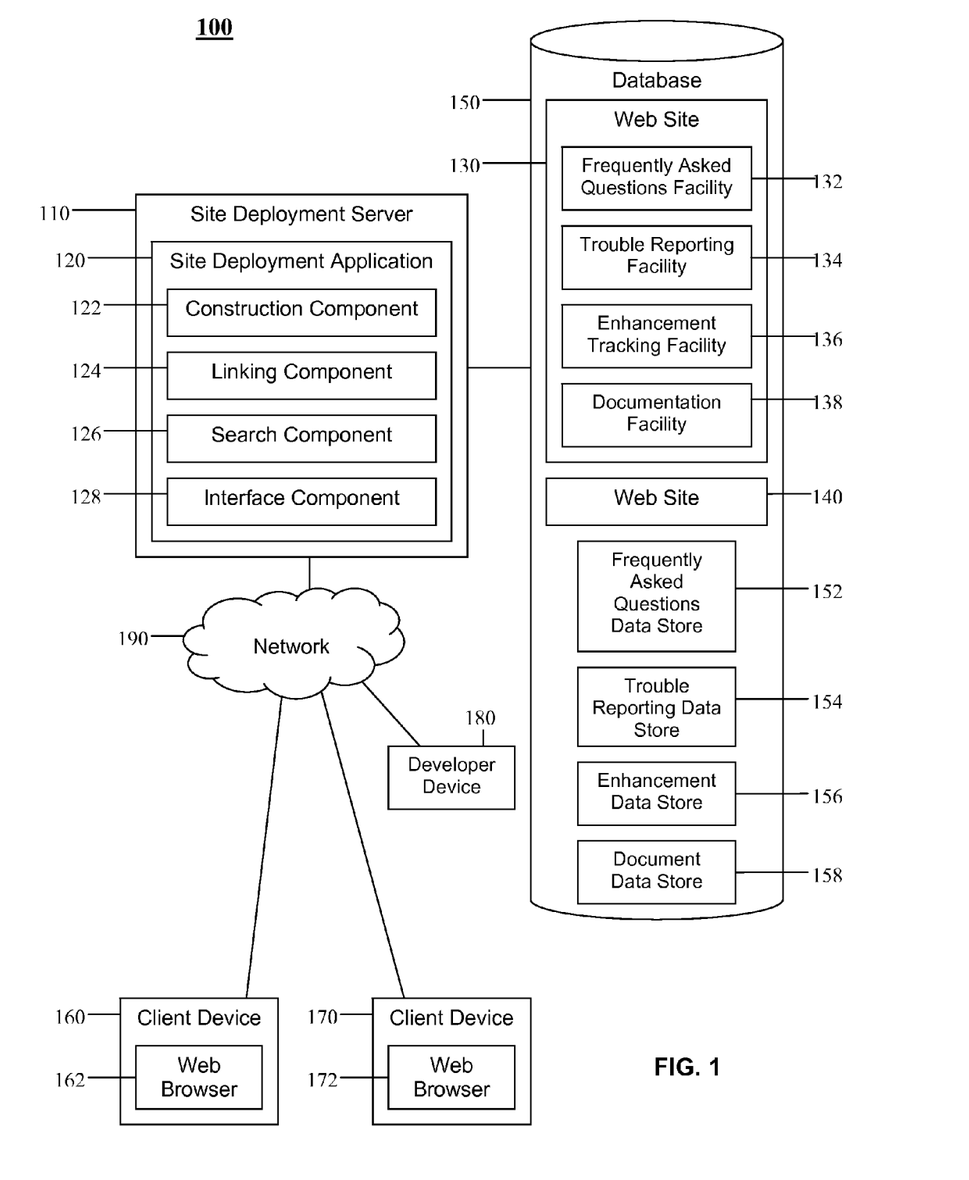
FIG. 1 is a block diagram of a system according to an embodiment of the disclosure.

Turning now to FIG. 1, a system 100 of a web site deployment framework is provided. The system 100 comprises a site deployment server 110, a site deployment application 120, web sites 130, 140, a database 150, client devices 160, 170, a developer device 180, and a network 190.

The site deployment server 110 may be a computer system. Computer systems are discussed in greater detail hereinafter. The site deployment server 110 may comprise one computer or a plurality of computers, for example, a server farm wherein many server computers cooperate to share a processing load. The site deployment server 110 may comprise a plurality of computers that are located at different places, for example, to provide geographical diversity and increased service reliability. The site deployment server 110 executes one or more applications including the site deployment application 120.

The site deployment application 120 executes on the site deployment server 110 and creates a plurality of web sites 130, 140 containing facilities providing information and access to problem-solving resources. The web sites 130, 140 may be hosted by the database 150 that is associated with the site deployment server 110. The site deployment application 120 processes requests from client devices 160, 170 to build web sites 130, 140 about specific subject areas of interest to groups of users in an organization. The client devices 160, 170 may be used by employees or other users associated with the organization, for example a business enterprise, government agency, or non-profit organization operating the site deployment server 110.

The site deployment application 120 may build a group of software facilities providing services associated with the web site 130. The site deployment application 120 may build a frequently asked questions facility 132, a trouble reporting facility 134, an enhancement tracking facility 136, and a documentation facility 138 for the web site 130. Each of these facilities provides access to content or data stored in areas in the database 150 reserved for the web site 130 and for the specific facility. The database 150 may regard data stores for each facility collectively as a single data store, permitting rapid access to information associated with each facility. The site deployment application 120 creates linkages between the facilities provided by each web site 130. The linkages permit cross referencing by client devices 160, 170 between the facilities while searching for, viewing, and adding content to web sites 130, 140.

In a large organization such as a multinational corporation, some web sites 130, 140 may be created for primarily internal use and for specific and limited purposes. A group assembled to work on a project may use a web site 130 to share information about the project and collaborate more easily. A product development group with development teams at several locations around the world may operate internal web sites 130, 140 for posting and answering questions, opening trouble tickets about the web site 130 or associated applications, requesting enhancements to the web site 130 or associated components, and hosting documentation about products the group is developing or other relevant subjects. The human resources organization of the same corporation may operate a plurality of internal web sites 130, 140 on the subjects of compensation, diversity in hiring and promotion, and harassment lawsuit avoidance, for example. The finance department of the company may run a plurality of web sites 130, 140 to help employees deal with foreign exchange problems, budgeting issues, and financial reporting deadline compliance challenges.

While the examples provided describe web sites 130, 140 that are for internal use only by employees working in the specific departments or functional areas of a corporation, the web sites 130, 140 in some cases may be made available to parties outside the corporation, for example customers, contractors, suppliers, and professionals such as legal counsel and accountants. Access to the web sites 130, 140 also may be provided to employees in more than one department in the corporation. For example, some employees in the human resources department that deal with compensation matters may be provided access to certain areas of a web site 130 on financial reporting deadline compliance that is the primary responsibility of the finance department. For a large multinational corporation, web sites 130, 140 may be operated for limited problem areas or discussion topics within the subject areas described. Subjects such as diversity in hiring and promotion and foreign exchange problems for a multinational corporation may be too broad to devote only a single web site 130 to each subject. In practice, a plurality of web sites 130, 140 may be devoted to specific individual diversity issues such as quotas for hiring of handicapped persons and providing time off for religious holidays and various countries and locales.

The present disclosure teaches the site deployment application 120 permitting expedient creation of the frequently asked questions facility 132, the trouble reporting facility 134, the enhancement tracking facility 136, and the documentation facility 138 to be accessible within a new web site 130. The initial establishment of the web site 130 on the database 150 may be done by a developer device 180 associated with the organization's information technology function. Once the basic structure of the web site 130 is in place, the adding of structure and data and the creation of links between data stores in the database 150 may be done by appointed client devices 160, 170 associated with the organizational unit that will be using the web site 130. By permitting the organizational units control over the structure, management, and access to their own web site 130, greater accountability and efficiency and reduced bureaucracy may be achieved by limiting the involvement of corporate information technology units in normal site management activities. Reduced technical support expense may also result.

The site deployment application 120 builds the frequently asked questions facility 132, may load some initial combinations of questions and answers into the database 150, and creates an interface into the frequently asked questions facility 132 permitting client devices 160, 170 to ask questions and be provided answers. The site deployment application 120 may provide a structure to the frequently asked questions facility 132 to allow subordination of question and answer items about narrow subjects to be accessible from items about broader, more encompassing subjects. Users may access the frequently asked questions facility 132 to post questions and to provide answers and commentary to previously posted questions. Users may additionally build structures or hierarchies of frequently asked questions and answers wherein some questions and their answers effectively may be made subject headings and contain a hierarchy of subordinate questions and answers about particular items within the general subject heading.

The site deployment application 120 also builds the trouble reporting facility 134 for opening trouble tickets related to defects with an application used by the department, group, or project team. An internal collaborative web site 130 used by a global product development team may, for example, not convert English to metric measurements to the level of precision necessary, causing confusion among product development engineers in North America and Europe. A client device 160 associated with the development team could create a trouble ticket using the trouble reporting facility 134 and an area of the database 150 associated with the facility could be accessed to store information associated with the problem and receive text updates and commentary about the problem. An analyst or other person or group with the requisite technical competence would be assigned to the trouble ticket. A level of severity also would be provided to the trouble ticket.

The site deployment application 120 builds the enhancement tracking facility 136 to receive, manage, and resolve requests to enhance the web site 130 to improve functionality, usability, and/or appearance of the web site 130 or applications associated with the web site 130. The present disclosure teaches enhancement requests originating as trouble tickets, receiving conversion to enhancement requests, and receiving an estimated level of effort (LOE) associated with fulfilling the request.

The site deployment application 120 provides interfaces for each of the frequently asked questions facility 132, the trouble reporting facility 134, the enhancement tracking facility 136, and the documentation facility 138 permitting client devices 160, 170 to gain access to each of the facilities, navigate about and add text, and, given proper permissions, make changes to records in the facilities. The site deployment application 120 may present a master interface for all of the facilities and provide controls for use by the client devices 160, 170 in making selections within the facilities.

The site deployment application 120 comprises the construction component 122 that builds web sites 130, 140 and their facilities at the initial request of the developer device 180 on behalf of an authorized client device 160. A web site 130, upon being created, has a development owner that may be a developer device 180 associated with the organization's information technology or data services organization. Upon receiving a request from an authorized client device 160 representing the organizational unit that is in need of a web site 130 to be created, the developer device 180 establishes the web site 130 on the database 150 and creates an area within the database 150 wherein the data records for the facilities associated with the web site 130 will be stored. The developer device 180 may create an entry in the domain name system (DNS) allowing the client device 160 to provide the new web site 130 with a user-friendly name. Beyond these initial few setup steps, the structuring, management, and oversight of the web site 130 may be turned over to the client devices 160, 170 in the organizational group for whom the web site 130 was created. One or more client devices 160, 170 may be named functional owners of the web site 130 and be given oversight responsibility for the web site 130.

Web sites 130, 140 and the site deployment application 120 used to create them on the site deployment server 110 may use the JAVA SERVER PAGES (JSP) technology or other technology that permits the creation of dynamically generated web pages. The technologies allow pre-defined actions to be embedded into static page content and compiled on the site deployment server 110 at runtime of each page request by a client device 160. The compilation at runtime of each page request permits the flexibility taught herein of linking the frequently asked questions facility 132, the trouble reporting facility 134, the enhancement tracking facility 136, and the documentation facility 138 in the manner needed by the user for the specific problem at hand. The client device 160 may use a web browser 162 or other client application to request and receive custom JAVA SERVER PAGE transmissions providing a plurality of views into the database 150. A web-based application accessible through a web site 130 may interact with various areas of the database 150 and business logic tools located in the organization's information infrastructure to customize a response to the client device 160 requesting information. Active JAVA elements may be rendered for the requesting client device 160 using hypertext markup language (HTML). The use of JAVA SERVER PAGES promotes the creation of a dynamic response to the client device 160. Web-based applications based on JAVA SERVER PAGES may commingle database code and content, web page design code, and control flow code. The present disclosure teaches the use of the struts application framework for creating web sites 130, 140 wherein the JAVA SERVER PAGES have a model-view-controller architecture and the web sites 130, 140 are provided by JAVA WEB SERVICES. The use of the struts framework in embodiments taught herein may promote an efficient separation of the model, the application logic that interacts with a database, from the view, hypertext markup language pages presented to the client device 160, and the controller, the instance that passes information between view and model.

After the developer device 180 establishes the web site 130 and creates space on the database 150 for data records associated with the web site 130, the construction component 122 of the site deployment application 120 begins assembling the web site 130. The developer device 180 may step back and permit authorized client devices 160, 170 to structure the web site 130 in the manner suited to the organizational function or purpose intended for the web site 130. Controls, menu types, and selections may be created with linkages between some menu items, for example. The present disclosure teaches simplicity and accessibility for non-technical users.

An authorized client device 160 may build the frequently asked questions facility 132 on the web site 130. At around the same time, a frequently asked questions data store 152 may be created in the database 150 to store questions and answers associated with subject matter of the web site 130. When a question is submitted by the client device 160 through an interface created by the site deployment application 120, the frequently asked questions facility 132 receives the question and accesses the frequently asked questions data store 152 to determine if the question has been asked previously. If so, the frequently asked questions facility 132 draws the stored answer and delivers it to the client device 160. If the question has not previously been asked, i.e. the frequently asked questions facility 132 cannot find the literal question or a string of characters in the question portion of the frequently asked questions data store 152 resembling the literal question, it may post the question in an area visible to the client devices 160, 170 and it may send requests to certain client devices 160, 170 requesting their assistance. The client devices 160, 170 that are given the responsibility to provide functional support and oversight may be provided application specific support roles (ASSR). One of the roles for the frequently asked questions facility 132 may be to add, edit, and delete questions and answers using an interface. The client devices 160, 170 in these oversight roles may authorize some or all client devices 160, 170 to add, edit, and delete content as well as provide commentary.

The frequently asked questions facility 132 may provide answers in the form of ordinary text or may provide web links to documents or other information sources located on servers or databases within or outside of the organization. A user identification and timestamp is associated with questions, answers, and comments added through the frequently asked questions facility 132. The present disclosure teaches the creation of a hierarchy of frequently asked questions permitting questions and their answers to be organized in logical structures. A very general question and its answer may provide linkages to more specific questions and answers related to the same general subject. An authorized client device 160 may create a hierarchy or grouping of questions by selecting an existing entry and selecting an edit option to create a sub-group. Subsections may not be deleted until their associated questions and answers are deleted first. The frequently asked questions facility 132 may provide a sorting function for answers received and may also sequence or prioritize answers delivered to a client device 160 in a variety of manners, for example listing the most frequently accessed answers at or near the top of the list of delivered answers. Templates may be made available to provide client devices 160, 170 greater ease in framing questions.

The construction component 122 also builds the trouble reporting facility 134 for the web site 130 that is linked to and supported by a trouble reporting data store 154 stored in the database 150. The trouble reporting facility 134 provides a trouble ticketing system enabling a client device 160 to report a problem with the web site 130 or one of the services or applications delivered through the web site 130. Trouble tickets are provided ticket numbers and are assigned to persons responsible for working the trouble ticket to resolution or other disposition. Trouble tickets in the trouble reporting data store 154, including comments and other entries made by the assigned person or others, may be visible to client devices 160, 170 with general access to the web site 130. Some client devices 160, 170 may be authorized to add comments to open or closed trouble tickets. When a trouble ticket is opened, a severity is assigned.

A client device 160 accessing the trouble reporting facility 134 may view open and closed tickets to avoid logging an issue when an open or closed duplicate already exists. Given permissions, a client device 160 may view all open tickets in the trouble reporting data store 154 related to the web site 130. Client devices 160, 170 are encouraged to open only one issue per ticket. The ticket allows users and individuals assigned to work the ticket to add notes and links. In some cases, not all notes added are visible to everyone. Assigned persons may add notes that are visible only to other assigned persons. Persons with oversight responsibility for the web site 130 as well as managers and supervisors may also make entries that are not visible to all client devices 160, 170.

When an open trouble ticket receives comments by the client device 160 that opened the ticket or the person assigned to work the ticket, electronic mail messages may be sent out to interested parties. Messages also may be sent when the status of the trouble ticket changes. A client device 160 associated with a user working in the finance department at a foreign location may open a ticket associated with an application accessible through one of the finance department's web sites 130, 140 about an international taxation issue, for example. An expert on the subject at corporate headquarters may be assigned the ticket. The user may have discovered a defect or bug in the application that causes an incorrect tax computation to be made under certain circumstances. As the assigned headquarters expert begins researching, determining if a defect does in fact exist, and responding to the problem, he or she may enter comments into the trouble ticket that are visible to various parties depending on the nature of the comment and severity of the issue. Associates of the assigned person may be authorized to read the trouble ticket and add comments. Given permissions, customers and other outside parties may also have access to view some of the comments and other content of the trouble ticket. The trouble reporting facility 134 may provide functionality to enter linkages and references to other trouble tickets when applicable.

The construction component 122 also builds the enhancement tracking facility 136 that allows client devices 160, 170 to request enhancements to applications associated with web sites 130, 140. An enhancement is a request to make a change to an application to improve the functionality, usability, or a cosmetic aspect of the application. Enhancement requests are tracked in an enhancement data store 156 in the database 150. Enhancement requests are initially entered by client devices 160, 170 using the trouble reporting facility 134 and may be converted to enhancement requests by the individual assigned to work the matter. Since enhancement requests are opened in the interest of improving or adding functionality or a cosmetic effect to an application, enhancements may receive a lower priority than trouble tickets. The individual assigned to work the enhancement request may designate a level of effort (LOE) estimated to fulfill the request. The individual also may project a completion date for fulfilling the enhancement request. The individual also may reject the enhancement request. Unlike trouble tickets, enhancement requests are worked as capacity allows. An enhancement request asking for a purely cosmetic change most likely will be provided a lower priority than an enhancement request that may ask for additional functionality that provides appreciable efficiencies to client devices 160, 170 using the web site 130.

The construction component 122 of the site deployment application 120 also builds a documentation facility 138 for the web site 130. Client devices 160, 170 may use the documentation facility 138 to store documents and other electronic media relevant to the applications in a document data store 158 in the database 150. A client device 160 may store a document related to the subject matter covered by the web site 130 wherein the document is relevant and of interest but not directly related to a frequently asked question, a trouble ticket, or an enhancement. Documents stored in the document data store 158 may contain text only, may contain graphics or other media including hypertext, or may contain links to other servers and databases either within or outside the organization. The reading pane provided by the interface of the documentation facility 138 may permit documents to be displayed using a plurality of well known software applications. Documents stored in the document data store 158 may be sorted in a variety of manners. Entries to the document data store 158 are accompanied by a user identification and time stamp for each entry. As with the other facilities of the site deployment application 120, at least one client device 160 may be provided oversight responsibility over the documentation facility 138 and the document data store 158 to monitor the quality and quantity of documentation stored and remove documentation that may be out of date, no longer relevant, or may not have been accessed for an extended period of time.

The site deployment application 120 also comprises the linking component 124 that provides linkages between the frequently asked questions facility 132, the trouble reporting facility 134, the enhancement tracking facility 136, the documentation facility 138, and their corresponding data stores in the database 150. The present disclosure teaches answers found in the frequently asked questions data store 152 to contain references where appropriate to related text in trouble tickets found in the trouble reporting data store 154. Open or closed trouble tickets may likewise contain references to frequently asked questions items. Frequently asked questions items may contain references to items in the document data store 158. A client device 160 entering questions using the frequently asked questions facility 132 may be provided a reference to a trouble ticket or enhancement request either presently being worked or already closed. The present disclosure teaches linkages between the frequently asked questions data store 152, the trouble reporting data store 154, the enhancement data store 156, and the document data store 158 such that a question or inquiry directed to one of the facilities of the web site 130 may generate inquiries across all four data stores as well as inquiries to other servers and databases that may be linked to the site deployment server 110 and the database 150.

The linking component 124 allows a client device 160 searching a series of closed trouble tickets for solutions to a problem in the trouble reporting data store 154 to be provided references to items in the frequently asked questions data store 152 containing the solution. A client device 160 searching open or closed enhancement requests for information stored in the enhancement data store 156 about enhancing a feature may be directed to a reference in the document data store 158 that describes configuration steps needed by the client device 160. The linking component 124 regards access to any one of the frequently asked questions facility 132, the trouble reporting facility 134, the enhancement tracking facility 136, and the documentation facility 138 as a potential access to each of the four facilities and the data stores associated with the facilities. The linking component 124 has the intelligence to recognize a query or request to one of the facilities and expand or adapt the request such that the capabilities of each of the facilities may be used to search their associated data stores.

By linking frequently asked questions to trouble tickets, the linking component 124 may save a client device 160 considerable time and effort in solving a problem. Because the present disclosure teaches the ability of many users to view and comment on most of the items in each of the four data stores, information may be accessed, updated, and shared more readily than otherwise. A client device 160 with the proper permissions may be able to perform cut and paste activities of text between information in the data stores. For example, a user of the client device 160 with a frequently asked questions item and a trouble ticket simultaneously open could copy text from the frequently asked questions item and paste the text into the trouble ticket with a comment about where the pasted text came from. The client device 160 also may perform drag and drop operations of graphical user interface items within and between presentation windows. A client device 160 may additionally type or paste hypertext markup (HTML) links into windows associated with trouble tickets and frequently asked questions. A user identification and time stamp associated with the user of the client device 160 accompanies items entered into trouble tickets, enhancement requests, and frequently asked questions items.

The linking component 124 regards the frequently asked questions data store 152, the trouble reporting data store 154, the enhancement data store 156, and the document data store 158 as a single data store in the database 150. Because the components of the system 100 share the same "back end" or data store structure, data conversions issues between the component data stores and the facilities in the site deployment application 120 may be reduced. The linking of the facilities in the web site 130 and the data stores in the database 150 and the general accessibility provided to each may create a community environment for the users of the client devices 160, 170 associated with the business or functional unit using the web site 130. The ability of an authorized user of a client device 160, for example a manager, to shift back and forth between trouble tickets and enhancement requests may allow the person to review the items, make recommendations, and provide authorizations expediently.

The site deployment application 120 also comprises the search component 126 that is related to the linking component 124. The search component 126 is a search engine that allows the client device 160 to search each of the frequently asked questions data store 152, the trouble reporting data store 154, the enhancement data store 156, and the document data store 158 from any one of the facilities within the site deployment application 120. When a client device 160 enters a question into the frequently asked questions facility 132, if the answer cannot be found in the frequently asked questions data store 152, the other data stores may automatically be searched. When a client device 160 opens a trouble ticket and begins typing or pasting a problem description into the ticket, the search component 126 may capture the entered text and search the data stores in the database 150 and generate suggested solutions from, for example, the document data store 158, before the trouble ticket is ever fully entered. A variety of search criteria may be used to search the trouble reporting data store 154 when a client device 160 is entering a problem description. The search component 126 may use fuzzy logic to search for variations of problem descriptions entered by a client device 160. If a client device 160 enters a problem description but does not precisely enter the error message received, the search component 126 may recognize that the user of the client device 160 meant something else and may search and generate responses based on this assumption. The search component 126 has the intelligence to recognize such situations and vary input into the search functionality of the site deployment application 120 that may provide a broader set of possible answers for the user.

While the linking component 124 and the search component 126 may assist client devices 160, 170 in searching the frequently asked questions data store 152 for assistance with resolving trouble tickets and fulfilling requests for enhancements, they may also provide effectively similar functionality in the reverse direction as well. When trouble tickets are resolved or enhancement requests are completed, or significant conclusions or discoveries are reached or made during their resolution or completion, content from these items may be incorporated into new or existing frequently asked question items. For example, fields in the trouble ticket documents may be blocked and conveniently copied to frequently asked question items. Conclusive information in trouble tickets may be converted into a question and answer format and a new or modified frequently asked questions item may be placed in the frequently asked questions data store 152. The linking component 124 then may link the finalized trouble ticket with the new or modified frequently asked question item. The search component 126 likewise may link the two items such that a client device 160 searching for an item of information in the trouble reporting data store 154 may be provided a reference to the location in the frequently asked questions data store 152 wherein the information may be found. Likewise with enhancement requests, when an enhancement request is completed or nearing completion, a new or modified entry may be placed in the frequently asked questions data store 152 linking the subject matter in the enhancement request to the frequently asked questions item. When an existing frequently asked questions item may be expanded upon or broadened by the completion of a trouble ticket or finalization of an enhancement request, the present disclosure teaches the migration or addition of the trouble ticket or enhancement information into the related existing frequently asked questions item.

The site deployment application 120 also comprises the interface component 128 that provides a unified and logical interface or user dashboard to the client device 160. The interface component 128 provides windows and views for each of the frequently asked questions facility 132, the trouble reporting facility 134, the enhancement tracking facility 136, and the documentation facility 138 and their corresponding data stores in the database 150 that are consistent in presentation and functionality to the client device 160. The interfaces for each of the facilities may be accessed from a web browser 162, 172 or other application executing on the client devices 160, 170, respectively. The interface component 128 provides a consistent set of controls to navigate between the facilities and maintain any combination of the facilities simultaneously open and accessible on the display of the client device 160. Since each of the facilities provides a front end and a different view of the contents of the database 150, each with different tools for accessing and manipulating the contents, the interface component 128 provides the JAVA SERVER PAGES functionality for the database contents to be arranged in a manner that meets the needs of the user as entered at the client device 160.

The interface component 128 provides an interface for creating trouble tickets and interworking with a plurality of trouble tickets stored in the trouble reporting data store 154. The interface component 128 allows a client device 160 to convert a selected trouble ticket to an enhancement request when appropriate. The interface component 128 also provides an enhancement interface for displaying a plurality of enhancement tickets stored in the database 150 and for adding an estimated level-of-effort for completing an enhancement. The interface component 128 also provides a frequently asked questions interface for adding questions and for viewing a previously stored plurality of frequently asked questions and answers associated with the questions stored in the database 150. The frequently asked questions interface promotes associating the frequently asked questions to categories of questions stored in the database 150. The interface component 128 also provides a document interface for adding documents to the document data store 158 as well as associating stored documents with the trouble ticket data store 154 and the enhancement data store 156 providing client devices 160, 170 that create trouble tickets or enhancement requests access to information that may provide relief.

While FIG. 1 depicts the web sites 130, 140 as contained within the database 150, portions of the web sites 130, 140 may reside or execute elsewhere. While FIG. 1 does not detail component facilities for the web site 140 in the manner detailed for the web site 130, the web site 140 contains the same components as the web site 130 with the same functionality. While the descriptions herein may suggest that the database 150 hosting the frequently asked questions data store 152, the trouble reporting data store 154, the enhancement data store 156, and the document data store 158 may correspond only to the web site 130, the data stores may in fact be accessible by the web site 140 and a plurality of other web sites not shown. While the frequently asked questions data store 152, the trouble reporting data store 154, the enhancement data store 156, and the document data store 158 are depicted in FIG. 1 as separate components of the database 150, the other components of the system 100 may regard them as a single data store with information in each equally accessible by the facilities of the site deployment application 120. A plurality of data stores may be resident in the database 150. While FIG. 1 depicts one database 150, a plurality of databases may be resident in the system 100 performing the same functions as the database 150.

The network 190 promotes communication between the components of the system 100. The network 190 may be any communication network including a public data network (PDN), a public switched telephone network (PSTN), a private network, and/or a combination thereof.

Figure 2:
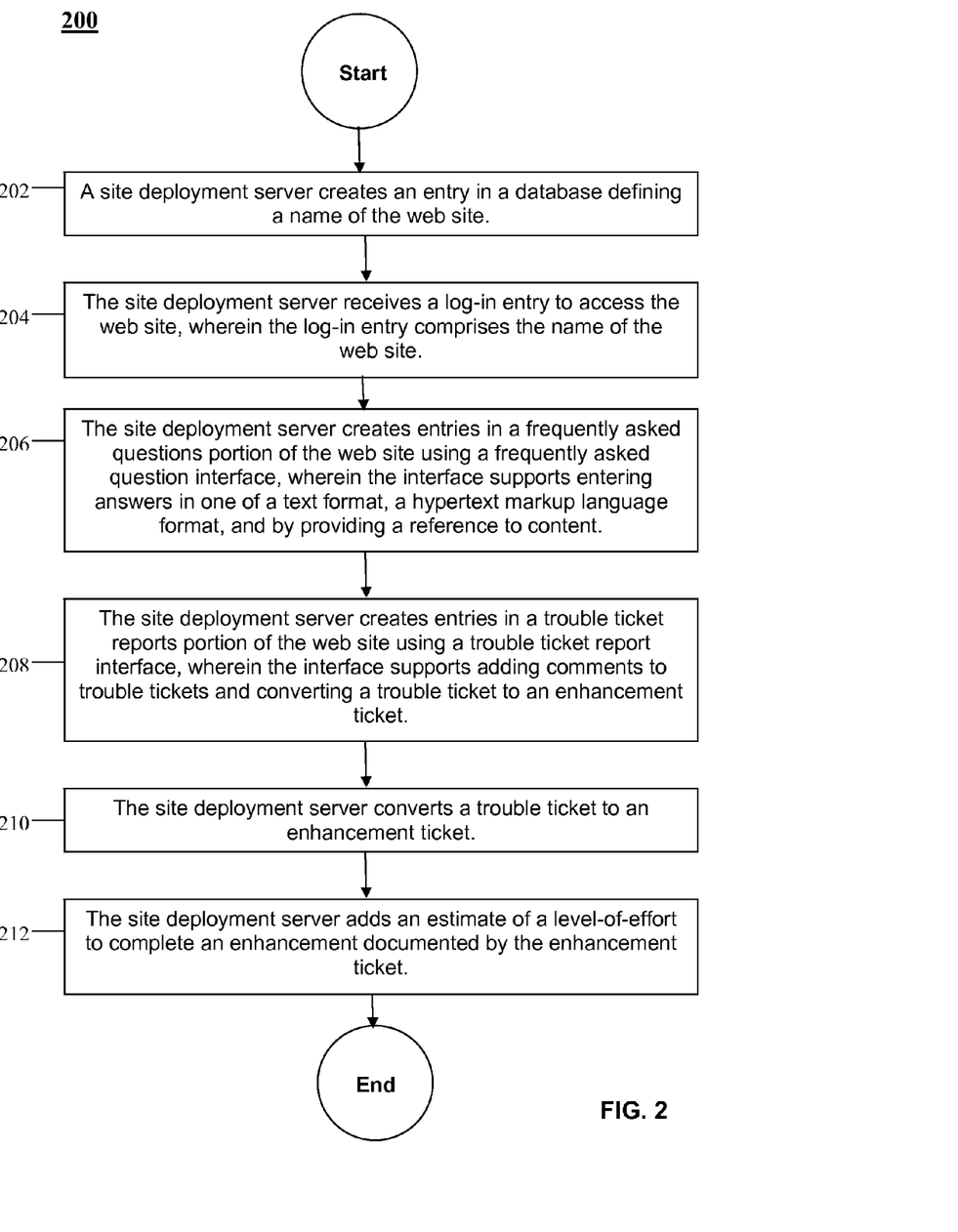
FIG. 2 is a flow chart illustrating a method according to an embodiment of the disclosure.

Turning now to FIG. 2, a processor-implemented method 200 of building a web site is provided. Beginning at block 202, the site deployment server 110 creates an entry in the database 150 defining a name of the web site 130. The developer device 180, at around the same time as the web site 130 is created at the request of the client device 160, accesses the database 150, creates data records associated with the web site 130 and associates a name for the web site 130 with the data records.

At block 204, the site deployment server 110 receives a log-in entry to access the web site 130, wherein the log-in entry comprises the name of the web site 130. Client devices 160, 170 that have been provided access to the web site 130 may be required to provide a user name and password to gain access to the web site 130. The web site 130 may contain confidential or proprietary information.

At block 206, the site deployment server 110 creates entries in the frequently asked questions portion of the web site 130 using a frequently asked questions interface. The interface supports entering answers in one of a text format, a hypertext markup language format, and by providing a reference to content. A client device 160 accessing the site deployment application 120 uses the frequently asked questions facility 132 to enter at least one answer to a question observed there or elsewhere on the web site 130. The user of the client device 160 may provide the answer using a variety of formats including providing a reference to content located on another server or database.

At block 208, the site deployment server 110 creates entries in a trouble ticket reports portion of the web site 130 using a trouble ticket report interface, wherein the interface supports adding comments to trouble tickets and converting a trouble ticket to an enhancement ticket. The trouble ticket report interface is associated with the trouble reporting facility 134.

At block 210, the site deployment server 110 converts a trouble ticket to an enhancement ticket. A user of a client device 170 given responsibility to work on a trouble ticket, after testing and recreating a situation or condition initially reported as a defect with the web site 130 or associated application, may determine that the software and/or hardware are functioning as designed. The assigned individual may additionally determine that what is being requested in the trouble ticket is in fact an enhancement of the web site 130 or application wherein additional functionality or a cosmetic change is what the requesting party wants. The assigned individual may cause the site deployment server 110 to convert the trouble ticket to an enhancement request and may alter the severity of the item.

At block 212, the site deployment server 110 adds an estimate of a level-of-effort to complete an enhancement documented by the enhancement ticket. The assigned individual may cause the site deployment server 110 to designate a level-of-effort to the enhancement ticket. This designation may provide an indication of the man hours or expense involved in completing the enhancement request. Supervisors may use the search capabilities taught herein the sort open enhancement requests by designated level-of-effort when allocating technical resources to projects.

Figure 3:
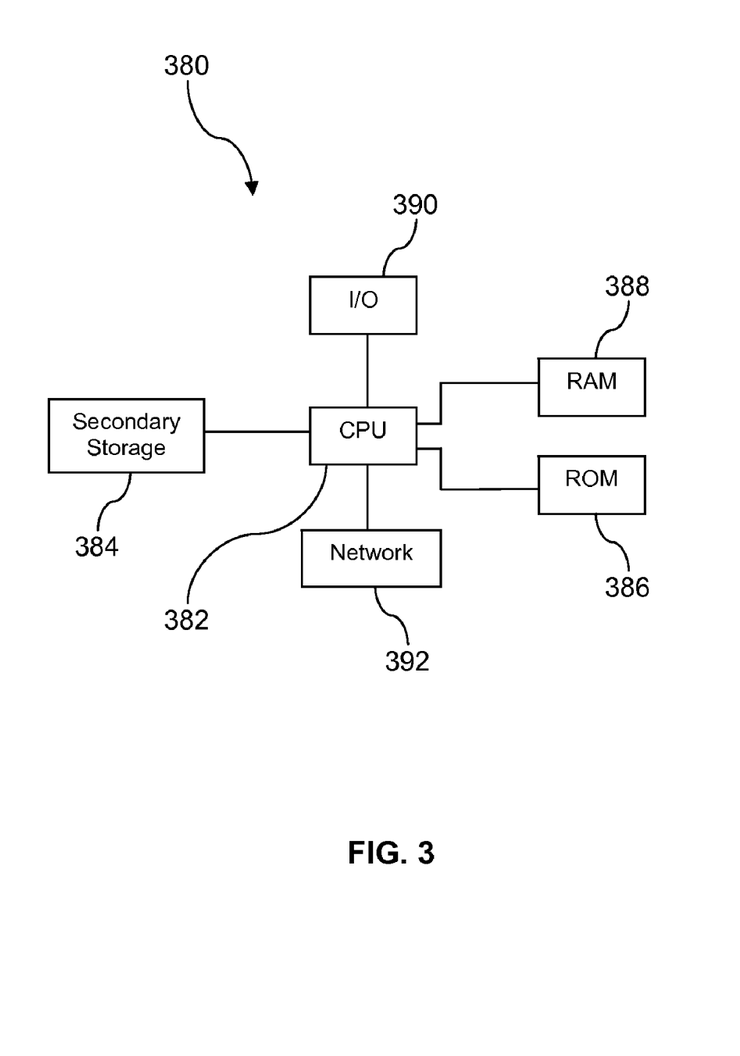
FIG. 3 illustrates an exemplary computer system suitable for implementing the several embodiments of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A web site construction system, comprising:
a processor;
a database coupled to the processor;
a memory; and
an application stored in the memory that, when executed by the processor,
builds a frequently asked question facility for a first web site, the frequently asked question facility supported by a frequently asked question portion of the database, wherein the frequently asked question facility provides an interface for adding questions, adding answers, adding references to answers, and defining the subordination among a plurality of frequently asked question entries,
builds a trouble reporting facility for the first web site, the trouble reporting facility supported by a trouble reporting portion of the database, wherein the trouble reporting facility provides an interface for adding trouble descriptions, identifying an individual assigned to fix the trouble, and adding comments,
builds an enhancement tracking facility for the first web site, the enhancement tracking facility supported by an enhancement portion of the database and the enhancement tracking facility coupled to the trouble reporting facility so that an enhancement entry in the enhancement portion of the database is created by converting a trouble ticket entry in the trouble reporting portion of the database,
builds a documentation facility for the first web site, the documentation facility supported by a documentation portion of the database, and
provides a plurality of linkages between the frequently asked questions facility, the trouble reporting facility, the enhancement tracking facility, and the documentation facility, wherein the plurality of linkages comprise:

a first linkage between an answer in the frequently asked question portion of the database and a trouble ticket entry in the trouble reporting portion of the database, a second linkage between an answer in the frequently asked question portion of the database and an item stored in the documentation portion of the database, and a third linkage between an answer in the frequently asked question portion of the database and an enhancement entry in the enhancement portion of the database.

2. The system of claim 1, wherein the application comprises a plurality of JAVA SERVER PAGES.

3. The system of claim 2, wherein the JAVA SERVER PAGES have a model-view-controller architecture.

4. The system of claim 1, wherein the documentation facility promotes defining text documents and hyper text markup language documents and promotes providing references to remote content.

5. The system of claim 1, wherein the frequently asked question facility promotes defining text answers and hyper text markup language answers and promotes providing references to remote answers.

6. The system of claim 1, wherein the enhancement facility promotes adding an estimate of a level-of-effort to complete an enhancement.

7. The system of claim 1, wherein the application supports a plurality of independent web sites and wherein the application distinguishes the data associated with the plurality of independent web sites stored in the database using filtering based on a name of the plurality of web sites.

8. A trouble ticket and enhancement ticket system, comprising:

a computer having a processor and memory;

a database coupled to the computer; and an application stored in the memory that, when executed by the processor, provides a trouble ticket interface for creating and interworking with a plurality of trouble tickets stored in the database, for adding comments to a selected trouble ticket, for searching the trouble tickets, and for converting a selected trouble ticket to an enhancement ticket in the database, provides an enhancements interface for displaying a plurality of enhancement tickets stored in the database and for adding an estimated level-of-effort for completing the enhancement, provides a frequently asked questions interface for viewing a plurality of frequently asked questions stored in the database and for adding a frequently asked question and answer to the database, presents controls to select the trouble ticket interface, the enhancements interface, and the frequently asked questions interface on a display screen, and provides a plurality of linkages between the plurality of trouble tickets stored in the database and at least one of the plurality of enhancement tickets stored in the database and at least one of the plurality of frequently asked questions stored in the database, wherein the plurality of linkages direct a search of the plurality of trouble tickets stored in the database to the corresponding at least one of the plurality of enhancement tickets stored in the database and at least one of the plurality of frequently asked questions stored in the database.

9. The system of claim 8, wherein the application is comprised of a plurality of JAVA SERVER PAGES.

10. The system of claim 8, wherein the frequently asked questions interface promotes associating the frequently asked questions to categories of questions.

11. The system of claim 8, wherein the frequently asked questions interface associates a user identity and a timestamp with entries.

12. The system of claim 8, wherein the application further provides a document interface for adding documents to the trouble ticket and enhancement ticket system, and wherein the application further presents a control to select the document interface on the display screen.

13. The system of claim 12, wherein the document interface promotes adding documents in one of text format and hypertext markup language format.

14. A processor-implemented method of building a web site, comprising:

creating an entry in a database defining a name of the web site;

receiving a log-in entry to access the web site, wherein the log-in entry comprises the name of the web site;

creating entries in a frequently asked questions portion of the web site using a frequently asked question interface, wherein the interface supports entering answers in one of a text format, a hypertext markup language format, and by providing a reference to content;

creating entries in a trouble ticket reports portion of the web site using a trouble ticket report interface, wherein the interface supports adding comments to trouble tickets and converting a trouble ticket to an enhancement ticket;

converting a trouble ticket to an enhancement ticket;

providing a plurality of linkages between the entries in the trouble ticket reports portion and at least one of the entries in the frequently asked questions portion of the web site and the enhancement ticket converted from the trouble ticket wherein the plurality of linkages direct a search of the entries in the trouble ticket reports portion to the corresponding entries in the frequently asked questions portion and the enhancement ticket converted from the trouble ticket;

adding an estimate of a level-of-effort to complete an enhancement documented by the enhancement ticket; and incorporating content from at least one of the entries in the trouble ticket reports portion or the enhancement ticket into at least one of the entries in the frequently asked questions portion in response to resolving one or more trouble tickets or completing the enhancement ticket.

15. The method of claim 14, wherein the web site is provided by JAVA WEB SERVICES.

16. The method of claim 14, further comprising searching the entries in the trouble ticket reports portion of the web site.

17. The method of claim 14, further comprising presenting all of the entries in the trouble ticket reports portion of the web site for view by a user.

18. The method of claim 14, further comprising presenting all of the entries of an enhancement tickets portion of the web site.

19. The method of claim 14, further comprising creating entries in a document portion of the web site.

20. The method of claim 19, wherein creating entries in the document portion of the web site comprises one of adding text content and adding a reference to remote text content.

* * * * *